(12) United States Patent
Thompson

(10) Patent No.: US 8,517,167 B2
(45) Date of Patent: Aug. 27, 2013

(54) DISTRIBUTION AUGER FOR ROLL-OFF BOX

(75) Inventor: Bruce Thompson, Granbury, TX (US)

(73) Assignee: Bruce Thompson, Grandbury, Hood County, TX (US)

(*) Notice: Subject to any disclaimer, the term of this patent is extended or adjusted under 35 U.S.C. 154(b) by 0 days.

(21) Appl. No.: 12/885,109

(22) Filed: Sep. 17, 2010

(65) Prior Publication Data

US 2011/0061989 A1    Mar. 17, 2011

Related U.S. Application Data

(60) Provisional application No. 61/243,492, filed on Sep. 17, 2009.

(51) Int. Cl.
*B65G 33/14* (2006.01)
*B65G 41/00* (2006.01)

(52) U.S. Cl.
USPC .............. 198/658; 198/671; 209/31; 209/35; 209/241

(58) Field of Classification Search
USPC .......................................... 198/671, 658, 311
See application file for complete search history.

(56) References Cited

U.S. PATENT DOCUMENTS

| 4,603,775 | A | * | 8/1986 | Plett | 198/589 |
| 4,684,458 | A | * | 8/1987 | Grotto | 209/31 |
| 5,845,762 | A | * | 12/1998 | Stark | 198/550.1 |
| 6,209,880 | B1 | * | 4/2001 | Turnwald et al. | 277/402 |
| 6,763,932 | B2 | * | 7/2004 | Stenson et al. | 198/670 |
| 7,500,814 | B2 | * | 3/2009 | Meyer | 414/327 |

* cited by examiner

*Primary Examiner* — Kavel Singh

(57) ABSTRACT

One aspect provides a distribution auger. The distribution auger comprises a fill hopper, a flighting, and an outer covering surrounding the flighting. The fill hopper is located at a first end of the distribution auger and the outer covering includes a plurality of openings located on a bottom side such that, when the distribution auger is horizontally configured, solid matter introduced to the fill hopper located at the first end of the distribution auger falls through the plurality of holes when propelled by the flighting.

5 Claims, 7 Drawing Sheets

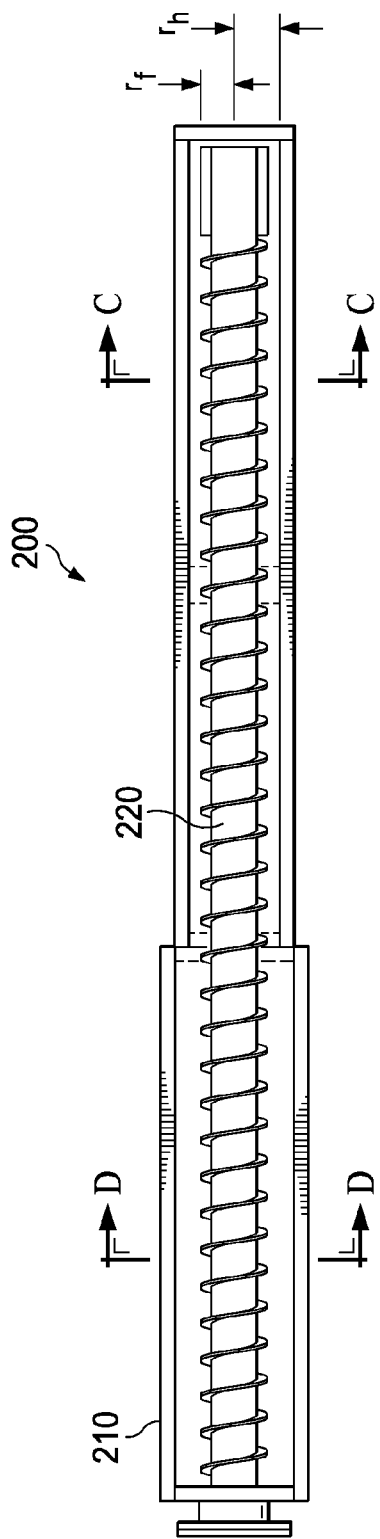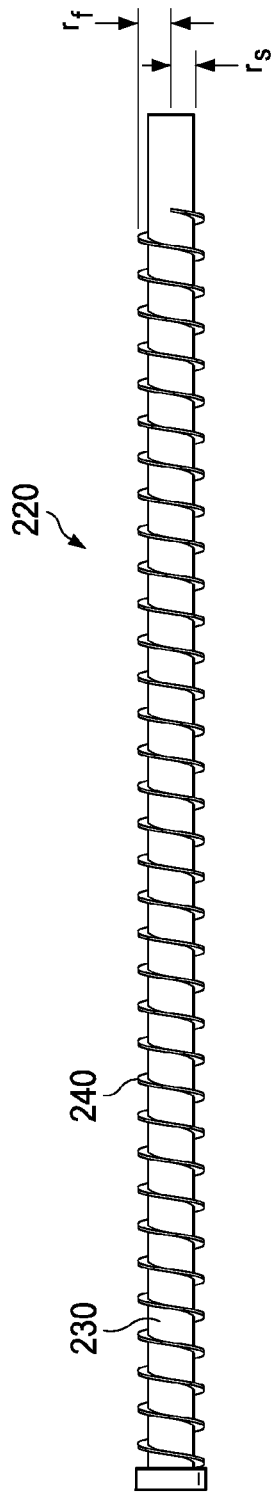
FIG. 2A
FIG. 2B

DISTRIBUTION AUGER FOR ROLL-OFF BOX

CROSS-REFERENCE TO RELATED APPLICATION

This application claims the benefit of U.S. Provisional Application Ser. No. 61/243,492, filed by Bruce Thompson on Sep. 17, 2009, entitled "GAS BUSTER/SAN AUGAR," commonly assigned with this application and incorporated herein by reference.

TECHNICAL FIELD

The present disclosure is directed, in general to a receptacle and more specifically, to a backflow collection receptacle and method for using the same.

BACKGROUND

Production of oil and gas (e.g., hydrocarbons) from subterranean formations is dependent on many factors. These hydrocarbons must usually migrate through a low permeable formation matrix to drain into the wellbore. In many formations, the permeability is so low that it hinders the well's production rate and overall potential. In other wells, the near wellbore is damaged during drilling operations and such damage often results in less than desirable well productivity. Hydraulic fracturing is a process designed to enhance the productivity of oil and gas wells or to improve the injectivity of injection wells.

In the fracturing process, a viscous fluid is injected into the wellbore at such a rate and pressure as to induce a crack or fracture in the formation. Once the fracture is initiated, a propping agent, such as sand (e.g., often referred to as "frac" sand), is added to the fluid just prior to entering the wellbore. This sand laden slurry is continuously injected causing the fracture to propagate or extend. After the desired amount of proppant has been placed in the reservoir, pumping is terminated, and the well is shut-in for some period of time.

After the pressure is released from the wellbore, the sand, or at least a significant portion of the sand, remains within the fractured strata thereby holding the strata in a substantially fractured state. Accordingly, the oil and gas is allowed to flow freely. Unfortunately, as the oil and gas begin to flow it starts to push the fluid used to fracture the strata, as well as some unwanted particulates from the strata (including, frac sand, salts, etc.) back to the surface.

Simple frac tanks are commonly used to collect the unwanted fluid and particulates that backflow from the wellbore. A typical frac tank is configured as a large enclosure having a valve at the bottom thereof, often using a "gas buster" to dissipate the velocity of the backflow. When the frac tank is full of collected fluid, sand, salts, hydrocarbons, etc., an environmentally approved service must be employed to remove the contents thereof. A typical removal process initiates by removing the fluid from the frac tank via the valve at the bottom thereof. In this situation, as the sand is heavier than the other particles, the sand would be at the bottom of the tank. The fluid, hydrocarbons, salts, etc., most of which would be suspended in the fluid, would then be drawn through the sand and collected and disposed of. Unfortunately, the sand, in this removal scenario, becomes contaminated as the hydrocarbons and salts are drawn there through. Therefore, the sand must then be removed from the frac tank and processed so as to be safe for the environment. This process of collecting, removing, and decontaminating the backflow, including both the fluid and sand, is an extremely expensive process.

Accordingly, what is needed in the art is apparatus, and/or associated process, which reduces the time and expense associated with the collection and dispersal of the backflowed contaminants.

SUMMARY

One aspect provides a distribution auger. The distribution auger comprises a fill hopper, a flighting, and an outer covering surrounding the flighting. The fill hopper is located at a first end of the distribution auger and the outer covering includes a plurality of openings located on a bottom side such that, when the distribution auger is horizontally configured, solid matter introduced to the fill hopper located at the first end of the distribution auger falls through the plurality of holes when propelled by the flighting.

BRIEF DESCRIPTION OF THE DRAWINGS

For a more complete understanding of the present disclosure, reference is now made to the following descriptions taken in conjunction with the accompanying drawings, in which:

FIGS. 2A thru 2E illustrate various views of an elevated auger including a housing and a flighting;

DETAILED DESCRIPTION

Figure 1:
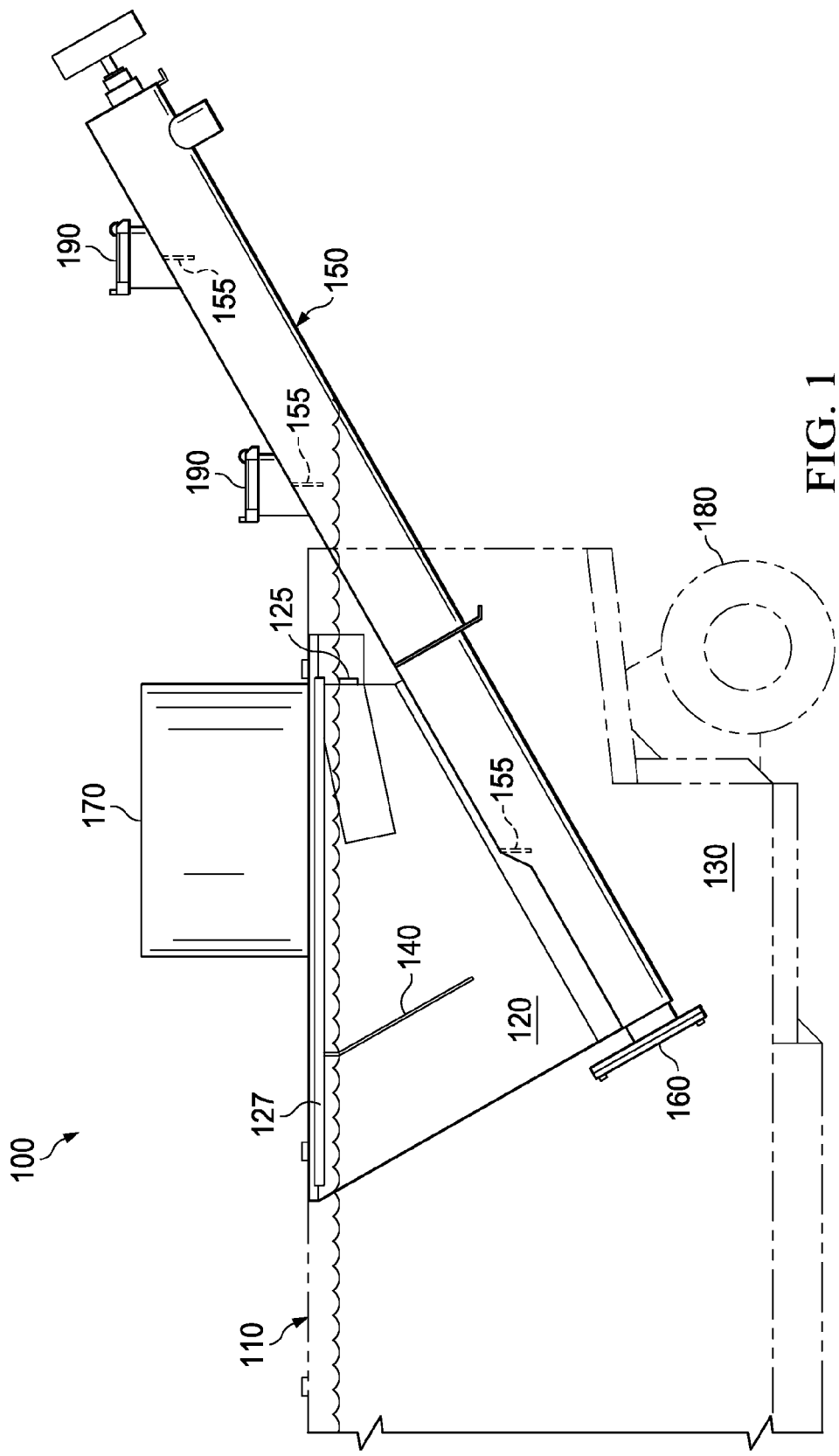
FIG. 1 illustrates a collection receptacle in accordance with the disclosure.

Referring initially to FIG. 1, illustrated is a collection receptacle 100 in accordance with the principles of the disclosure. The collection receptacle 100, as those skilled in the art appreciate, may be used to collect any number of different types of matter, including solid matter, liquid matter or a combination thereof. In one particular embodiment, the collection receptacle is configured to reclaim, including collecting and dispensing, backflow from a wellbore. For instance, the collection receptacle could be configured to reclaim fluid, hydrocarbons, frac sand, salts, etc., that would backflow from a wellbore after fracturing an oil and gas strata.

The collection receptacle 100 of FIG. 1 includes an enclosure 110. The enclosure 110, in this embodiment, is configured to collect solid and liquid matter. Moreover, the enclosure 110 of FIG. 1 includes a first portion 120 and a second portion 130. The first portion 120, in this embodiment, is configured to initially collect the solid and liquid matter. However, in this embodiment, the first portion 120 has an opening 125 (e.g., weir) in an upper region thereof. The opening 125, in one embodiment, is configured to allow excess collected liquid matter to overflow into the second portion 130 as the collected solid matter falls to a bottom of the first portion 120.

In one embodiment, the first portion additionally includes an emergency opening 127 configured to quickly divert extreme amounts of collected solid and liquid matter to the second portion 130. The purpose of the emergency opening 127, in this embodiment, is to prevent overflow of the collected liquid and/or solid matter from the enclosure 110 in the event the opening 125 cannot handle the volume of the incoming solid and liquid matter. As the emergency opening 127 is traditionally only used in extreme circumstances, the positioning of the emergency opening 127 is above the positioning of the opening 125. Accordingly, the emergency opening, in this embodiment, will only be employed in extreme circumstances. In the embodiment of FIG. 1, the opening 125 is located at the rear of the first portion 120, and the emergency opening 127 is located along the sides of the first portion 120. Nevertheless, the size, shape and location of each of the opening 125 and emergency opening 127 may be tailored on a use-by-use basis.

Located within the enclosure 110, and in this example the first portion 120, are one or more baffles 140. The baffles 140, in one example, are used to help direct the solid matter to the bottom of the first portion 120, among other uses.

The collection receptacle 100 further includes an elevated auger 150 extending into the enclosure 110, and more particularly the first portion 120 of the embodiment of FIG. 1. The auger 150, as would be expected, is configured to remove one or more contents from the enclosure 110. Nevertheless, in contrast to well known augers, the auger 150 is configured in such a way as to promote the separation of the solid matter from the liquid matter located within the enclosure 110, for example as the solid matter travels up the auger 150 and out of the enclosure 110. Specifically, the auger 150 of FIG. 1 includes a housing and a flighting, and in this embodiment the housing and flighting are configured in a manner to promote the aforementioned separation.

Figure 2C:
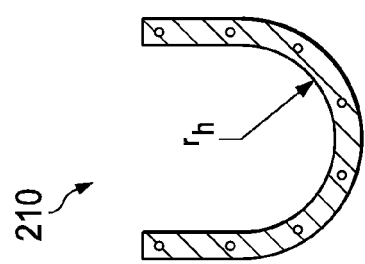
Figure 2D:
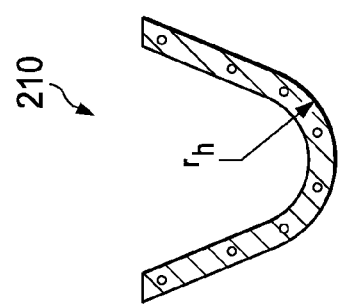

Turning briefly to FIGS. 2A thru 2D, illustrated are various views of an elevated auger 200 including a housing 210 and a flighting 220. FIG. 2A illustrates a cutaway view of the auger 200, whereas FIG. 2B illustrates the flighting 220, FIG. 2C illustrates a cross-section of the housing 210 taken through line C-C, and FIG. 2D illustrates a cross-section of the housing 210 taken through line D-D. In referring to the embodiment of FIGS. 2A thru 2D, the housing 210 has a radius $r_h$, and the flighting 220 has a lesser radius $r_f$, the difference in radius configured to promote separation of the solid matter from the liquid matter. Because of this lesser radius $r_f$ of the flighting 220, the auger 200 creates a solid matter tube surrounding the flighting 220 as the solid matter is removed from the enclosure. The term solid matter tube, as used herein, is intended to reference a tube like feature using the solid matter itself as the tube, as opposed to other rigid materials such as steel, iron, etc. The solid matter tube, a sand or mud tube in one example, provides a porous means for the liquid matter to travel back down the auger 200 as the solid matter travels up the auger 200. Likewise, as the solid matter travels up the auger 200 it is squeezed by the pressure of the solid matter tube against the flighting 220, thus further promoting the separation of the liquid matter.

The degree of difference between the housing radius $r_h$ and the flighting radius $r_f$ can be important to the ability of the auger 200 to promote separation. For instance, in one embodiment $r_f$ is less than about 90 percent of $r_h$. In yet another embodiment, $r_f$ is less than about 75 percent of $r_h$, and in yet another embodiment, $r_f$ is less than about 67 percent of $r_h$. For example, in the embodiment of FIGS. 2A thru 2D, $r_f$ ranges from about 5 inches to about 7 inches, whereas $r_h$ ranges from about 8 to about 9 inches.

It has been acknowledged that certain configurations of the auger 150 experience issues with the solid matter tube caving in, or sliding back down to the bottom of the first portion 120. This is particularly evident when the spacing between the flighting and the housing are large. This is also particularly evident in the embodiment wherein the centerline of the housing and centerline of the flighting do not coincide. Based upon this acknowledgment, and substantial experimentation, it has been recognized that blocks 155 (FIG. 1) may be placed between the flighting and housing at various positioned along the length thereof. The blocks 155, in this embodiment, typically extend from the inside wall of the housing toward the flighting, and in doing so help reduce the likelihood of the solid matter tube caving in. The blocks 155, in one embodiment, typically extend from the upper most inner surface of the housing toward the flighting, are located at one to six different locations, and are not required between the lower most inner surface of the housing and the flighting. Other configurations, beyond those just disclose, might also be used.

Turning now specifically to FIG. 2B, illustrated is the flighting 220. The flighting 220, as shown, includes a radius $r_f$. Likewise, a shaft 230 of the flighting 220 includes a radius $r_s$. To further promote the separation of the liquid matter from the solid matter, for example by way of increased pressing on the solid matter, the "teeth" 240 of the flighting 220 extend only a little way from the shaft. For example, in one embodiment, $r_s$ should be at least about 50 percent of $r_f$. In an alternative embodiment, $r_s$ should be at least about 65 percent of $r_f$, if not at least about 80 percent of $r_f$. For example, in the embodiment of FIG. 2B, $r_s$ ranges from about 3 inches to about inches, whereas $r_f$ ranges from about 5 inches to about 7 inches. To further promote separation, the teeth 240 may include notches therein, for example notches extending into the teeth 240 about 0.25 inches to about 1 inch.

Turning now specifically to FIGS. 2C and 2D, illustrated are the cross-sections of the housing 210. As is illustrated in FIG. 2C, this portion of the housing 210 has a u-shaped trough cross-section. In contrast, as is illustrated in FIG. 2D, this portion of the housing 210 has a flare-shaped trough cross-section. Nevertheless, other cross-sections could be used.

Figure 2E:
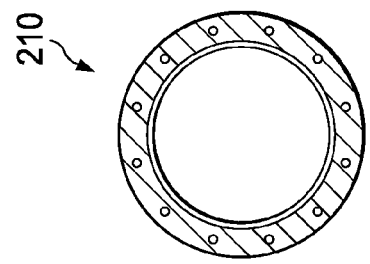

Turning briefly to FIG. 2E, illustrated is an alternative cross-sectional shape for the housing 210. In this embodiment, as shown, the housing 210 may have a circular cross-section. In this embodiment, the circular cross-section might have a radius ranging from about 8 to about 10 inches, and more particularly about 9 inches. As the radius of the flighting $(r_f)$ is less than the radius of the circular cross-section of the housing 210, in this embodiment $r_f$ ranging from about 5 to about 7 inches, a solid matter tube will likely form. It should be noted that in certain embodiments a centerline of the flighting will coincide with a centerline of the circular housing 210. In other embodiments, however, the centerlines will not coincide. For example, in one known embodiment the centerline of the flighting will be closer to a bottom surface of the housing 210 than an upper surface of the housing 210. In this embodiment, the distance between the flighting and the bottom surface of the housing 210 will be less than a distance between the flighting and the top surface of the housing 210.

Figure 3:
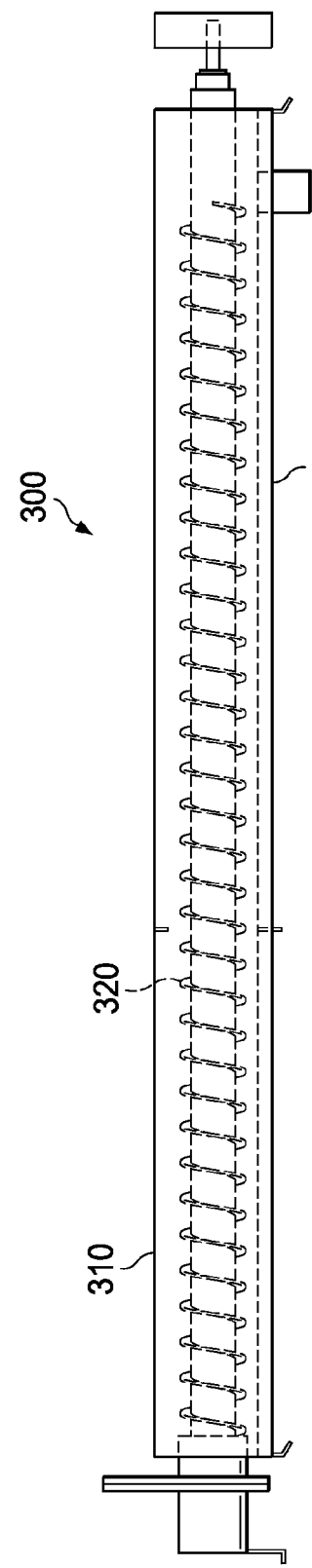
FIG. 3 illustrates an alternative embodiment of an elevated auger.

Turning now to FIG. 3, illustrated is an alternative embodiment of an elevated auger 300. The auger 300 of FIG. 3, in contrast to the degree of difference between the housing radius $r_h$ and the flighting radius $r_f$, includes a drain shoot 315 extending along a bottom surface of a housing 310 thereof. The drain shoot, regardless of the shape thereof, provides a pathway for excess fluid to travel back down the auger 300 as the solid matter travels up the auger 300. Accordingly, in this embodiment the housing 310 and the flighting 320 may have a somewhat similar overall shape and radius, but the added drain shoot 315 promotes the separation of the solid matter from the liquid matter. Accordingly, excess liquid matter squeezed from the solid matter travels down the drain shoot 315 as the solid matter travels up the auger 300.

Figure 4:
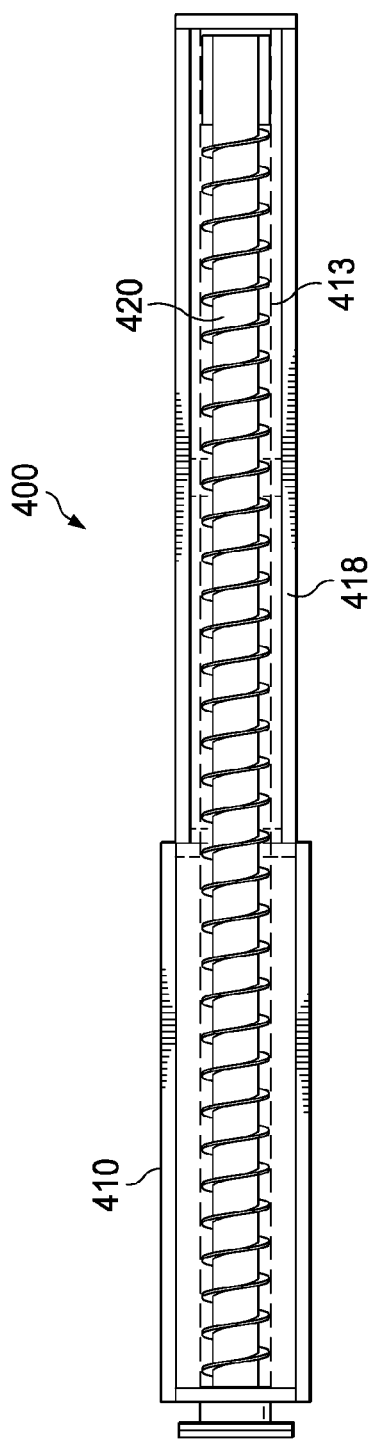
FIG. 4 illustrates yet another alternative embodiment of an elevated auger.

Turning now to FIG. 4, illustrated is an alternative embodiment of an elevated auger 400. The auger 400 of FIG. 4, in contrast to the degree of difference between the housing radius $r_h$ and the flighting radius $r_f$, includes a housing 410 having a first portion 413 and a second portion 418 and surrounding a flighting 420. In this embodiment, the first portion 413 is located between the second portion 418 and the flighting 420, and furthermore is perforated to promote the separation of the solid matter from the liquid matter. Accordingly, excess liquid matter squeezed from the solid matter exits the first portion 413 through the perforations therein, and then travels back down the auger 400 between the space separating the first and second portions 413, 418, respectfully.

Returning back to FIG. 1, the auger 150 includes a gate 160 at a bottom portion thereof. The gate 160, in this embodiment, is configured to allow solid matter to exit the auger 150 when operated in reverse. For example, certain situations may exist wherein solid matter remains within the enclosure 110, but there is a desire to fully empty the auger 150 of any solid matter. In this situation, the auger 150 could be operated in reverse, thereby emptying the auger 150 of any solid matter. The gate 160, in this example, allows the auger 150 to rid itself of solid matter without putting undue stress or torque on the auger 150 and/or its motor. Accordingly, the gate 160 may be opened when the auger 150 is run in reverse, and any solid matter within the auger 150 will be efficiently removed therefrom. In the embodiment shown, the solid matter exits into the second portion 130 of the enclosure 110.

The collection receptacle 100 of FIG. 1 further includes a gas buster 170 located between the enclosure 110 and a wellbore. The gas buster 170, as expected, is configured to dissipate energy associated with incoming solid and liquid matter. In the embodiment of FIG. 1, the gas buster 170 is coupled to an upper portion of the enclosure 110, for example near a rear thereof. The collection receptacle 100 of FIG. 1 further includes one or more wheels 180 coupled to the enclosure 110. The wheels 180 are configured to allow the collection receptacle 100 to roll from one location to another. Likewise, the auger 150 may include one or more inspection ports 190, for example with hinged covers, A collection receptacle, such as the collection receptacle 100 of FIG. 1, may be used for reclaiming backflow from a wellbore. In one embodiment, solid and liquid matter originally enters the first portion 120 of the enclosure 110 through the gas buster 170. As the solid matter sinks to the bottom of the first portion 120, the liquid matter (e.g., the water, salts, and hydrocarbons) float to the top. As the solid and liquid matter continue to fill the first portion 120 of the enclosure 110, the liquid matter begins to flow through the opening 125 designed therein, to the second portion 130 of the enclosure 110. Once the solid matter approaches the top of the first portion 120 where the opening 125 exists, the first portion 120 will be substantially full of solid matter, while the second portion 130 of the enclosure 110 will primarily contain the liquid matter.

In certain embodiments, it is important that the revolutions per minute (rpm) of the flighting within the housing is slow enough to remove the solid matter from the enclosure, while allowing the liquid matter to be adequately removed there from. Accordingly, in direct contrast to traditional auger systems, the rpm of the flighting is intentionally kept slow. For example, in one embodiment the flighting has an rpm of about 15 or less. In other embodiments, an rpm of 12 or less provides advantageous results. In yet another embodiment, an rpm of 8 or less, and more particularly between about 4 and 8, provides superior results.

In this scenario, the liquid matter can be easily removed from the first portion 120 of the enclosure 110 without further contaminating the solid matter. The solid matter that exits the top of the auger 150 tends to be only slightly damp. Moreover, it is believed that this solid matter need not be decontaminated or reconditioned before being reused or introduced into the environment. Accordingly, the expense associated with this decontamination or reconditioning may be spared.

Figure 5:
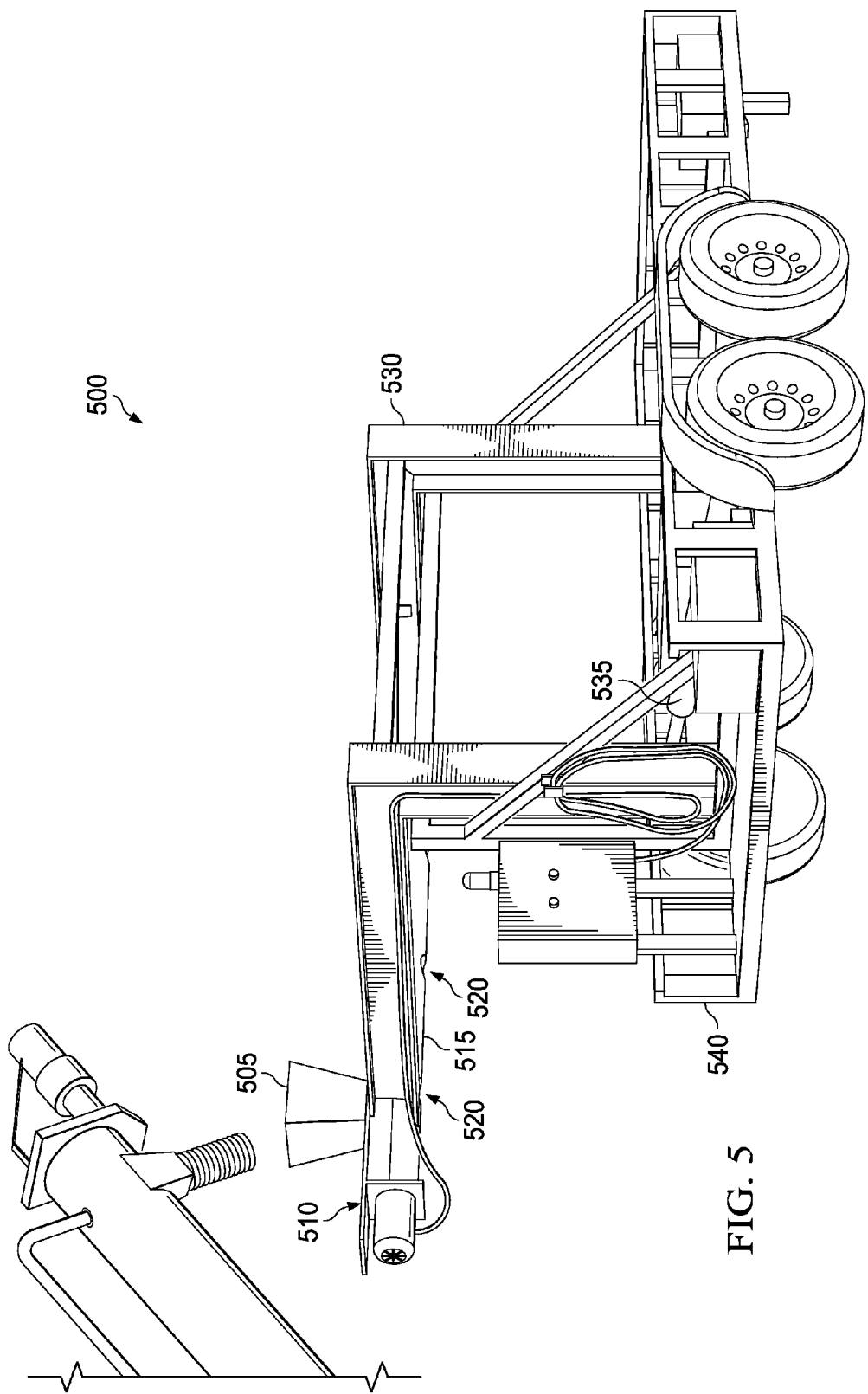
FIG. 5 illustrates a view of a distribution auger for a roll-off box ready to distribute.

FIG. 5 illustrates a view 500 of a distribution auger 510 in a horizontal configuration to move the solid matter into a roll-off box. In FIG. 5, an embodiment of the distribution auger 510 is shown with a fill hopper 505 located at a first end of the distribution auger 510 and an outer covering 515. Inside the outer covering is a flighting (not shown). Outer covering 515 includes a plurality of openings 520 located along a bottom side of the outer cover 515. This allows the solid matter progressing through the distribution auger 510 to fall into the roll-off box in an even manner. As the solid matter is introduced to the fill hopper 505 at the first end, the flighting propels the solid matter away from the first end to a first opening 520 located on the bottom side of the outer covering 515. The solid matter will then fall from the first opening 520 into the roll-off box until the solid matter rises to the first opening. At this point, the solid matter will not fall out of the first opening 520 and the flighting will propel the solid matter away from the first end and first opening to a second opening 520. The solid matter will fall through the second opening 520 until the solid matter rises to the second opening as with the first opening 520. The solid matter will continue to be propelled away from the first end and successive openings by the flighting, falling through a next opening until the solid matter rises to that opening. The flighting can be rotated by conventional means.

Figure 6:
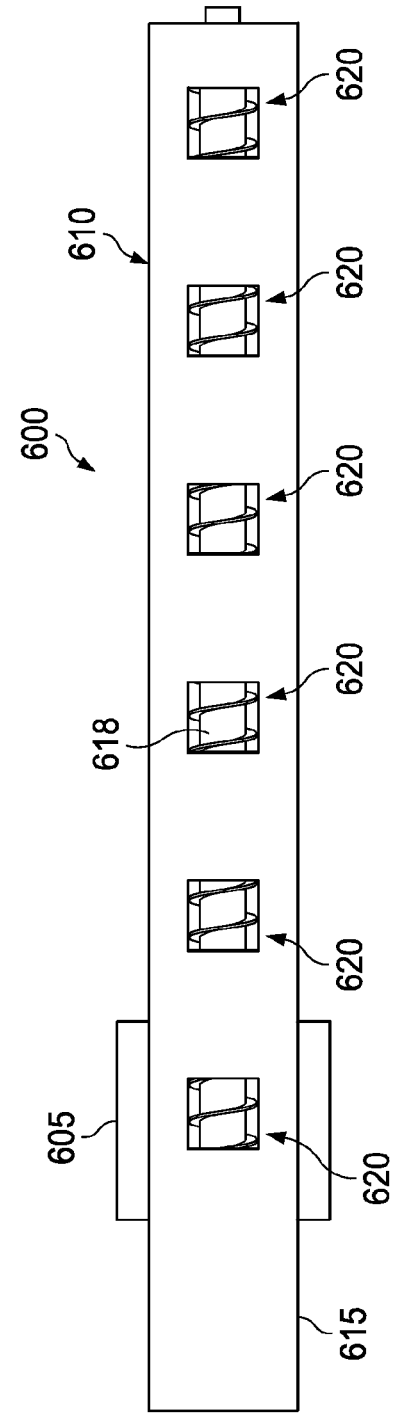
FIG. 6 illustrates an embodiment of the distribution auger.

FIG. 6 illustrates an embodiment 600 of distribution auger 610 featuring a bottom side of distribution auger 610. Fill hopper 605 is shown at a first end of the distribution auger 610. As discussed above, a plurality of openings 620 are located on the bottom side of outer covering 615. Flighting 618 is shown through the plurality of openings 620.

Figure 7:
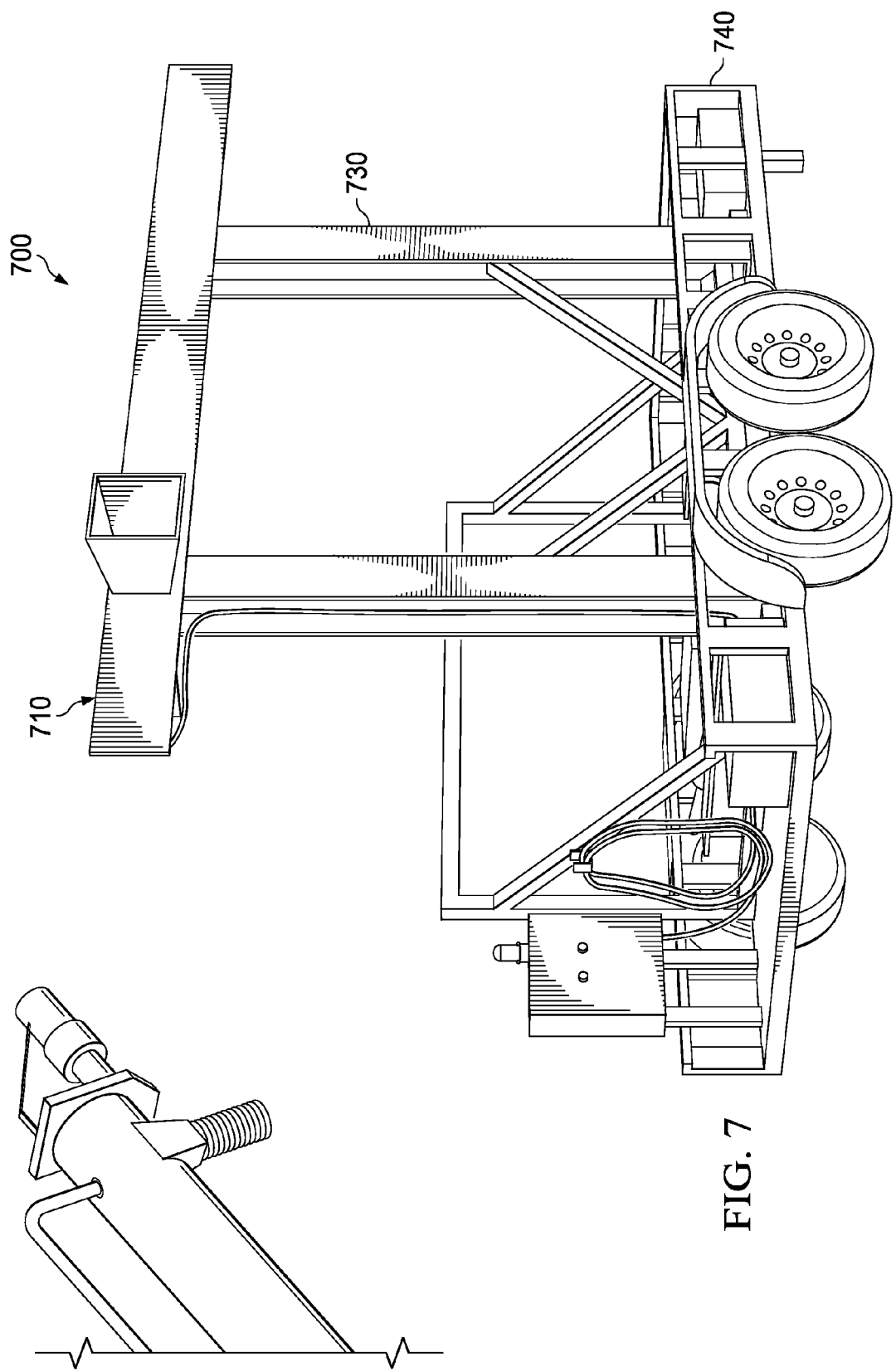
FIG. 7 illustrates a view of the distribution auger for a roll-off box ready for travel.
Figure 8:
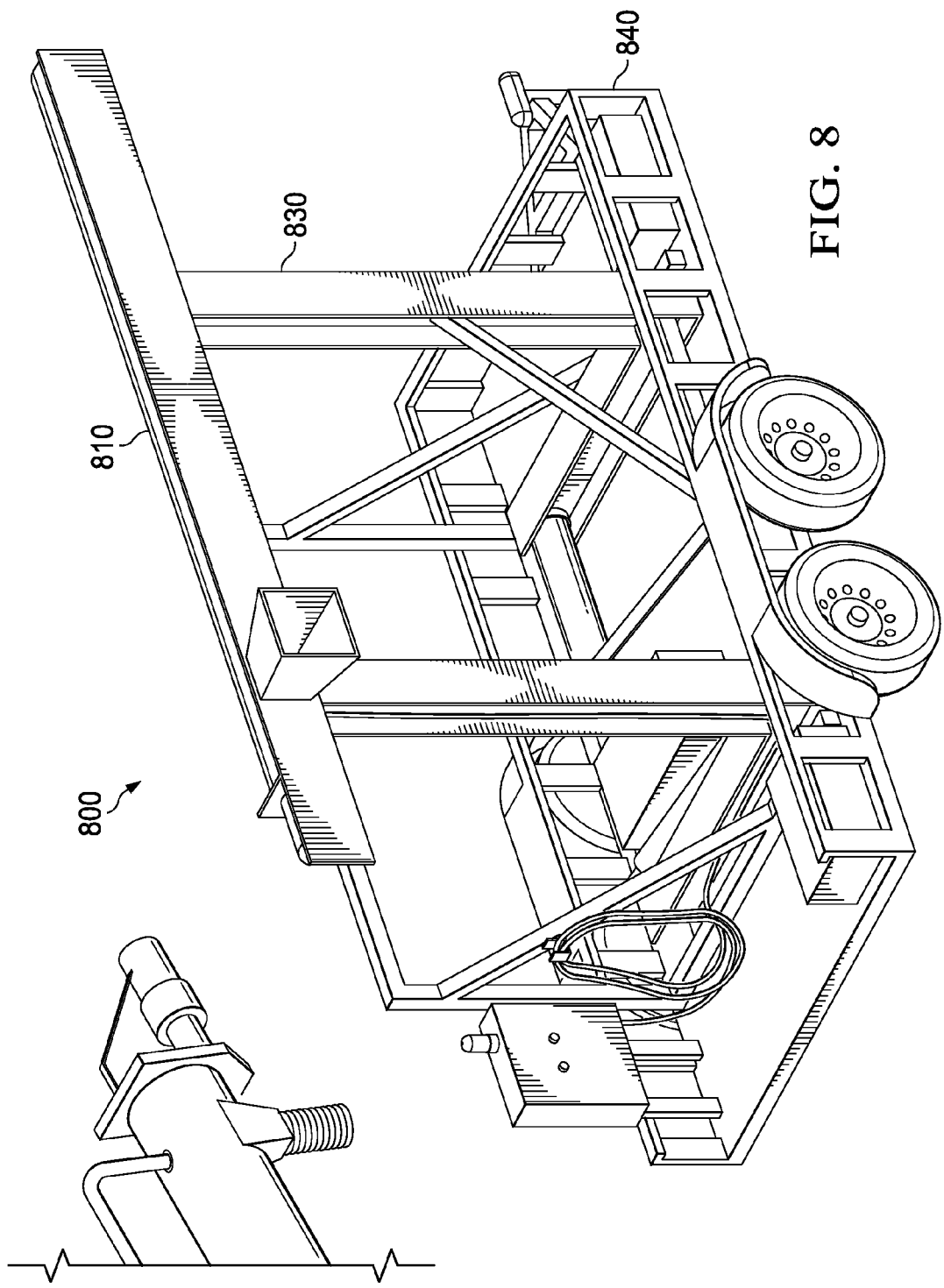
FIG. 8 illustrates another view of the distribution auger for a roll-off box ready for travel.

Once the roll-off box has been filled by the distribution auger 510, it can easily be transported. In the view 500, the distribution auger is mounted on support structure 530 which is affixed to a conventional trailer 540. Conventional hydraulics 535 can lower the support structure 530 and distribution auger 510 in a horizontal configuration so that the distribution auger is positioned over the roll-off box. FIG. 5 illustrates the support structure 530 and distribution auger 510 in a horizontal configuration lowered so that the distribution auger 510 is positioned over a roll-off box (not shown). FIG. 5 also illustrates the distribution auger 510 and support structure 530 affixed to the trailer 540. Once the roll-off box has been filled with the solid matter by the distribution auger 510, the hydraulics 535 can lift the support structure 530 and distribution auger 510 into a position on trailer 540, so that the trailer 540 can be transported. FIG. 7 illustrates a view 700 of distribution auger 710 and support structure 730 raised in a traveling position on trailer 740. FIG. 8 illustrates another view 800 of distribution auger 810 and support structure 830 raised in a traveling position on trailer 840.

Although the present disclosure has been described in detail, those skilled in the art should understand that they can make various changes, substitutions and alterations herein without departing from the spirit and scope of the disclosure in its broadest form.

What is claimed is:

1. A distribution auger, comprising:
   a fill hopper;
   a flighting; and
   an outer covering surrounding said flighting, wherein said fill hopper is at a first end of said distribution auger and said outer covering including a plurality of openings located on a bottom side such that, when said distribution auger is horizontally configured, solid matter introduced to said fill hopper located at said first end of said distribution auger falls through said plurality of holes when propelled by said flighting.

2. The distribution auger as recited in claim 1, wherein said solid matter falls out of a first opening located nearest said first end until said solid matter rises to said first opening.

3. The distribution auger as recited in claim 2, wherein said solid matter is propelled by said flighting away from said first end past said first opening when said solid matter has risen to said first opening to a second opening until said solid matter rises to said second opening.

4. The distribution auger as recited in claim 3, wherein said solid matter is further propelled by said flighting away from said first end past said second opening when said solid matter has risen to said second opening to a third opening until said solid matter rises to said third opening.

5. The distribution auger as recited in claim 1, further comprising:
   a support structure affixed to said outer covering; and
   a trailer, wherein said support structure is attached to said trailer and said outer covering, flighting, fill hopper, and support structure can be lifted substantially upright.

* * * * *